United States Patent [19]

Nguyen

[11] Patent Number: 5,759,431

[45] Date of Patent: Jun. 2, 1998

[54] STAIN RESISTANT COMPOSITION CONTAINING SULPHONATED SURFACTANT

[75] Inventor: Van Giao Nguyen, St. Clair, Australia

[73] Assignee: Minnesota Mining and Manufacturing Company, St. Paul, Minn.

[21] Appl. No.: 849,270

[22] PCT Filed: Nov. 17, 1995

[86] PCT No.: PCT/US95/15112

§ 371 Date: May 28, 1997

§ 102(e) Date: May 28, 1997

[87] PCT Pub. No.: WO96/18765

PCT Pub. Date: Jun. 20, 1996

[51] Int. Cl.$^6$ .................. D06M 10/08; C14C 9/00
[52] U.S. Cl. .................. 252/8.62; 8/115.56; 8/557; 8/560; 8/589
[58] Field of Search .................. 8/115.56, 557, 8/560, 589; 252/8.62, 8.61

[56] References Cited

U.S. PATENT DOCUMENTS

| | | | |
|---|---|---|---|
| 4,822,373 | 4/1989 | Olson et al. | 8/115.6 |
| 4,940,757 | 7/1990 | Moss, III et al. | 525/502 |
| 5,145,487 | 9/1992 | Hangey et al. | 8/557 |
| 5,182,154 | 1/1993 | Blyth et al. | 428/96 |
| 5,316,850 | 5/1994 | Sargent et al. | 428/378 |
| 5,356,689 | 10/1994 | Pechhold | 428/96 |
| 5,464,911 | 11/1995 | Williams et al. | 525/502 |
| 5,520,962 | 5/1996 | Jones, Jr. | 427/393.4 |
| 5,631,079 | 5/1997 | Gutman et al. | 428/327 |

FOREIGN PATENT DOCUMENTS

| | | | |
|---|---|---|---|
| 0 322 995 | 7/1989 | European Pat. Off. | D06M 15/41 |
| WO 91/02116 | 2/1991 | WIPO | D06M 15/263 |
| WO 91/19849 | 12/1991 | WIPO | D06N 7/00 |
| WO 94/25662 | 11/1994 | WIPO | D06M 15/263 |

*Primary Examiner*—Paul Lieberman
*Assistant Examiner*—Gregory R. Delcotto
*Attorney, Agent, or Firm*—Daniel C. Schulte

[57] ABSTRACT

A direct application process by spray, pad, foam, flood or roller coating of a chemical composition of Novolak resin, polymethacrylic acid, sulphated or sulphonated surfactants and a fluorochemical to provide stain resistance/release to fibrous material, particularly nylon and wool carpets. The finish offers desirable oil, water and dry soil repellency and acid dye stain release without adverse effect on texture (handle) and pile opening. The invention relates to the use of diethanolamine lauryl sulfate as a foaming surfactant that also has stain release property against artificial coloring material commonly found in food and beverages.

8 Claims, No Drawings

STAIN RESISTANT COMPOSITION CONTAINING SULPHONATED SURFACTANT

FIELD OF THE INVENTION

This invention relates to a composition and process for providing stain release/resistance to fibrous materials, particularly polyamide fibrous materials such as nylon and wool carpets, nylon, wool, silk fabrics and natural and synthetic leathers. The invention also relates to a direct application process for providing stain release/resistance to fibrous materials.

BACKGROUND

Fibrous polyamide articles such as nylon and wool carpets, nylon, wool and silk fabrics, natural leather and synthetic fibers are particularly susceptible to staining by natural and artificial acid colorants such as are commonly found in many foods and beverages. There has been a long felt need for compositions and processes for economically providing such fibrous polyamide articles with resistance to acid colorant staining.

U.S. Pat. No. 4,081,383 (Warburton, Jr., et al.) discloses an anti-soiling treatment for carpets and carpet yarns. The carpet or carpet yarns prior to carpet manufacture are coated with a polymeric material containing either (A) a blend of a methacrylic acid emulsion copolymer having an epoxy resin, or (B) a methacrylic acid emulsion copolymer having epoxy monomer units therein. The copolymer in either case contains 40% to 70% by weight methacrylic acid.

U.S. Pat. No. 4,669,812 (Munk et al.) discloses a method for imparting stain resistance to fibers containing free amino groups, and especially polyamide fibers by contacting the fiber with a solution of an aliphatic sulphonic acid containing 8 to 24 carbons, under acidic conditions. If the fibers are not thoroughly rinsed after application of the aliphatic sulphonic acid the product of this method after being dried has an undesirable finish due to the deposition of a filmy coating.

U.S. Pat. No. 4,579,762 (Ucci) discloses stain resistant nylon carpet in which the nylon fibers are made from polymers modified to contain, as an integral part of its polymer chain, aromatic sulphonate units and in which the backing adhesive contains a fluorochemical.

U.S. Pat. No. 4,329,391 (McAlister) discloses the treatment of synthetic fibers with a sulphonated polyester stain-releasing finish in an aqueous bath which includes the addition of water soluble salts to the aqueous fabric treating bath.

U.S. Pat. No. 3,322,488 (Freeman) discloses sulphomethylated condensation products of bisphenols and aldehydes for use in treating synthetic polyamide and polyurethane fibers to render them resistant to acid and direct dyes.

Australian Patent No. 599427 discloses a method for imparting polyamide materials with stain resistance to natural and synthetic colorants which comprises contacting the polyamide material with a water-soluble divalent metal salt of a partially sulphonated novolak resin.

Australian Patent No. 632641 (hereafter the "'641 patent") describes a method for imparting stain resistance to fibrous polyamide materials in which the polyamide materials are coated with stain resistant agents comprising (a) a partially sulphonated novolak resin, and (b) polymethacrylic acid, copolymers of methacrylic acid or combinations of said polymethacrylic acid and copolymers of polymethacrylic acid, or combinations of (a) and (b).

Conventional treatment processes require thorough washing of the treated polyamide material prior to drying in order to remove resin which is not associated with the fibers. Unfixed reagents cause gluing of the fibers. In terms of processing or treating large amounts of material, this is inconvenient and costly, as well as environmentally problematic given the organic waste produced.

Thus, there currently exists a need for compositions and processes for imparting stain resistance to fibrous materials which do not adversely effect the finish of the treated fiber, which fully treat the fibrous material avoiding "dead spaces", and which do not reduce the performance of fluorochemical treatments for oil and water repellency.

DISCLOSURE OF INVENTION

According to a first aspect of the invention there is provided an aqueous treating composition for providing stain release properties to fibrous materials which comprises:

(a) polymethacrylic acid or copolymers of methacrylic acid or combinations thereof;

(b) a partially sulphonated novolak resin;

(c) a surfactant containing a sulphate or sulphonate moiety; and (d) water.

In a preferred embodiment, the sulphonated surfactant is an aromatic or aliphatic mono- or poly-sulphonated fatty acid. In a still further preferred embodiment, the sulphonated surfactant is a sulphonated fatty acid alkanolamine condensate.

This invention is also directed to a process for providing fibrous material and leather with stain release properties which comprises applying directly to said material a composition which comprises:

(a) polymethacrylic acid or copolymers of methacrylic acid or combinations thereof;

(b) a partially sulphonated novolak resin;

(c) a surfactant containing a sulphate or sulphonate moiety; and (d) water and thereafter drying the material.

In a further preferred embodiment the treatment composition is applied to fibrous materials using a foaming agent as a carrier.

DETAILED DESCRIPTION

The aqueous treating composition for providing stain release properties to fibrous materials and leather comprises three key components:

(i) polymethacrylic acid or copolymers of methacrylic acid or combinations thereof, (ii) a partially sulphonated novolak resin, and (iii) a surfactant containing a sulphate or sulphonate moiety.

Preferably, the treatment composition also includes a volatile organic acid.

When the composition of the invention is applied to fibrous material, particularly polyamide fibers, such as nylon and wool carpets, nylon, wool, silk fibers and fabrics, natural and synthetic leathers and the like, stain release properties are imparted without loss of product finish.

The term "stain release" used herein refers to the property of ready release of stains which have been absorbed by fibrous materials or leather. The term "stain resistance" used herein refers to anti-wetting properties which result from treatment of fibrous materials or leather with fluorochemicals.

The polymethacrylic acid, copolymers of methacrylic acid, or combinations thereof are embraced in this disclosure by the term "methacrylic polymer", which is intended to include polymethacrylic acid homopolymer as well as polymers formed from methacrylic acid and one or more other monomers.

The monomers useful for copolymerization with the methacrylic acid are monomers having ethylenic unsaturation. Such monomers include, for example, monocarboxylic acids, polycarboxylic acids, and anhydrides; substituted and unsubstituted esters and amides of carboxylic acids and anhydrides; nitriles; vinyl monomers; vinylidene monomers; monoolefinic and polyolefinic monomers; and heterocyclic monomers.

Representative monomers include, for example, acrylic acid, itaconic acid, citraconic acid, aconitic acid, maleic acid, maleic anhydride, fumaric acid, crotonic acid, cinnamic acid, oleic acid, palmitic acid, vinyl sulphonic acid, vinyl phosphoric acid, alkyl or cycloalkyl esters of the foregoing acids, the alkyl or cycloalkyl groups having 1 to 18 carbon atoms such as, for example, ethyl, butyl, 2-ethylhexyl, octadecyl, 2-sulphoethyl, acetoxyethyl, cyanoethyl, hydroxyethyl and hydroxypropyl acrylates and methacrylates, and amides of the foregoing acids, such as, for example, acrylamide, methacrylamide, methylolacrylamide, and 1,1-dimethylsulphoethylacrylamide, acrylonitrile, methacrylonitrile, styrene, α-methylstyrene, p-hydroxystyrene, chlorostyrene, sulphostyrene, vinyl alcohol, N-vinyl pyrrolidone, vinyl acetate, vinyl chloride, vinyl ethers, vinyl sulphides, vinyl toluene, butadiene, isoprene, chloroprene, ethylene, isobutylene, vinylidene chloride, sulphated castor oil, sulphated sperm oil, sulphated soybean oil, and sulphonated dehydrated castor oil. Particularly useful monomers include, for example, ethyl acrylate, itaconic acid, sodium sulphostyrene, and sulphated castor oil. Mixtures of the monomers can be copolymerized with the methacrylic acid.

The methacrylic polymers useful in the present invention can be prepared using methods well known in the art for polymerization of ethylenically unsaturated monomers.

Preferably, the methacrylic acid comprises about 30% to 100% by weight, more preferably 60% to 90% by weight, of the methacrylic polymer. The optimum proportion of methacrylic acid in the polymer is dependent on the comonomers used, the molecular weight of the copolymer, and the pH at which the material is applied. When water-insoluble comonomers, such as ethyl acrylate, are copolymerized with the methacrylic acid, they may comprise up to about 40% by weight of the methacrylic polymers. When water-soluble monomers, such as acrylic acid or sulphoethyl acrylate are copolymerized with the methacrylic acid, the water-soluble comonomers preferably comprise no more than 30% by weight of the methacrylic polymer and preferably the methacrylic polymer also comprises up to about 50% by weight water-insoluble monomer.

Generally, the methacrylic polymer should be sufficiently water-soluble that uniform application and penetration of the polymer into the fiber surface can be achieved.

The glass transition temperature of the methacrylic acid copolymer can be as low as about 35° C. although high glass transition temperatures are preferred. When polymers having high glass transition temperatures, that is, as high as 230° C. or higher, are used, an additional benefit of improved soil resistance of the fibrous polyamide substrate can be obtained.

The weight average molecular weight and the number average molecular weight of the methacrylic polymer should be such that satisfactory stain resistance is provided by the polymer. Generally, the higher 90% by weight of the polymer material preferably has a weight average molecular weight in the range of about 3000 to 100,000. Generally, the lower 90% by weight of the polymer material preferably has a number average molecular weight in the range of about 500 to 20,000 more preferably in the range of about 800 to 10,000. Generally, more water-soluble comonomers are preferred when the molecular weight of the polymer is high and less water-soluble or water-insoluble comonomers are preferred when the molecular weight of the polymer is low.

Commercially available methacrylic polymers generally useful in the present invention include Leukotan™ 970, Leukotan™ 1027, Leukotan™ 1028 and Leukotan™ QR 1083 available from Rohm and Haas Company.

The partially sulphonated novolak resins useful in this invention include known substances such as those compositions which are condensation products of formaldehyde with bis (hydroxyphenyl) sulphone and phenylsulphonic acid. Instead of, or in addition to, formaldehyde, another aldehyde such as, for example, acetaldehyde, furfuraldehyde, or benzaldehyde, can be used to make the condensation product. Also, other phenolic compounds such as, for example, bis(hydroxyphenyl)alkane, for example, 2,2-bis(hydroxyphenyl)propane, and bis(hydroxyphenyl) ether compounds can be used instead of, or in addition to, the bis(hydroxyphenyl)sulphone. The sulphonated novolak resin is partially sulphonated, that is, has a sulphonic acid equivalent weight of about 300 to 1200, preferably 400 to 900.

Examples of such resins are disclosed in U.S. Pat. No. 4,592,490 (Blyth et al.). Also commercially available sulphonated novolak products are available such as: FX-369, a stain release product available from Minnesota Mining and Manufacturing Company, St. Paul, Minn., U.S.A.; Intratex™ N available from Crompton and Knowles Corp., North Carolina, U.S.A.; Erional™ PA available from Ciba-Geigy AG, Basle, Switzerland; Nylofixan™ P available from Sandoz Chemicals Ltd., North Carolina, U.S.A.; Mesitol™ NBS available from Mobay Chemical Corp., Pennsylvania, U.S.A.; Resist 4™ available from Lyndal Chemical Co., U.S.A.; Mak™ 7 available from Allied Signal Inc., New Jersey, U.S.A.; NRD 329 and NRD 332 available from DuPont Co., Delaware, U.S.A.; Ameriolate™ available from American Emulsions Co. Inc., Georgia, U.S.A.; and Synthabond™ 1938 available from Piedmont Chemical Industries, North Carolina, U.S.A. Sulphonation of phenolic compounds is taught, for example, in Sulfonation and Related Reactions, E E Gilbert, Interscience Publishers, 1965. Condensation of phenol-formaldehyde resins is taught, for example, in Phenolic Resins, A Knopf et al., Springer-Verlag, 1985.

Other partially sulphonated novolak resins which may be used in place of or in addition to the aforementioned novolak resins include those resins described in Australian Patent No. 599427, that is, a water-soluble divalent metal salt of a partially sulphonated novolak resin, wherein the salt contains less than 1% sulphonic acid moieties. The teachings of Australian Patent No. 599427 are incorporated herein by reference in their entirety.

The sulphated or sulphonated surfactant used in preparing the aqueous treating compositions of this invention include alkyl aryl sulphonated and hydroxyethylated fatty amines and their derivatives, such as Univadine™ PS-AU available from Ciba-Geigy AG, Basle, Switzerland, which comprises an alkyl aryl sulphonate and hydroxyethylated fatty amine of the formulae:

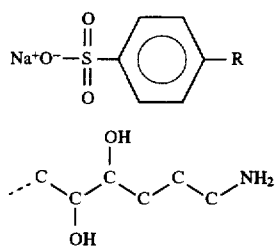

in which R is an alkyl chain of 14 to 18 carbons, and Miltopan™ D503 available from Henkel Australia Pty. Ltd., Victoria, Australia which has the formula:

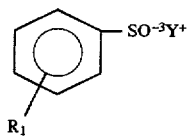

in which Y is an alkali, and $R_1$ is a C6 to C18 group which substitutes the phenyl ring at the 1, 2 or 3 position; sodium alkyl diphenyl ether disulphonates, such as Pelex™ SS-L available from Kao Corporation; sodium dodecyl diphenyl oxide disulphonate with high sulphur bond (containing ammonium thiosulphate) such as Pelex™ SS-H; dodecyl (sulphophenoxy) benzene sulphonic acid, disodium salt; oxybis (dodecylbenzene sulphonic acid) disodium salt such as Rhodacaltm DSB, Siponate™ DSB available from Rhone-Poulenc Pty. Ltd., Victoria, Australia; oxybis (dodecylbenzene sulphonic acid) disodium salt containing xylene, Kemmat™ SN18 available from Harcros Chemicals Pty. Ltd., New South Wales, Australia; aryl sulphonates; fatty amine polyglycol ether (sulphonate ethylene oxide condensate) such as TEBAN™ ES available from Dr TH B öhme Chemie, Geretsried, Germany; sodium salts of highly sulphonated oil/ethylene oxide condensate, such as MATEXIL™ LA-NS available from ICI, New South Wales, Australia; dodecyl (sulphophenoxy) benzene sulphonic acid, disodium salt oxybis (dodecylbenzene sulphonic acid) disodium salts containing at least 1% sodium sulphate and at least 3% sodium chloride, such as Dowfax™ 2-A1 available from Dow Chemicals Pty. Ltd., New South Wales, Australia; benzene sulphonic acid, dodecyl (sulphophenoxy) disodium salt, monosodium and didodecyl disulphonated diphenyl oxide such as CALFAX™ DB-45 available from Pilot Chemicals Inc., Los Angeles, Calif., U.S.A.. Other examples of sulphonated surfactants which may be used in the invention are disclosed in McCutcheon's Emulsifiers and Detergents, International Edition, 1983.

Aromatic or aliphatic mono or poly-sulphonated fatty acids are preferred, such as those containing 8 to 20 and more preferably 8 to 16 carbon atoms in the fatty acid aliphatic chains. Examples of alkyl groups which may used in the sulphonated fatty acids include, octyl, nonyl, decyl, dodecyl (lauryl), eicosyl, nicosyl, docosyl, tricosyl and tetracosyl group. The alkanoyl groups which may be used are monounsaturated analogues of those above, that is, octenyl, nonenyl and the like.

Alkanolamine and alkanolamide sulphonated fatty acids are preferred such as those containing $C_1$ to $C_{10}$ alkyl groups. These compounds are the condensation products of aliphatic fatty acids and hydroxy alkyl amines. Reference to alkanolamine and alkanolamide sulphonate fatty acids includes the mono-, di- and tri-alkanolamine and alkanolamide condensates. Fatty acid diethanolamide and diethanolamines are versatile and widely used surfactants. Examples of the fatty acid component of such compounds include ricinoleic, lauric, linoleic, tall oil, coco, lauric, oleic, stearic, capric and isosteric acid, all of which are described in Kirk-Othmer Encyclopedia of Chemical Technology 3rd Edition, Volume 22, at Table 24, which reference is incorporated herein in its entirety.

The most preferred sulphonated fatty acids according to this invention are the ethanolamine lauryl sulphates, particularly diethanolamine lauryl sulphate, a commercially available surfactant which is sold under the trade mark Empicol DA by Albright & Wilson, Victoria, Australia. Diethanolamine lauryl sulphate has the following formula:

$$C_{11}H_{23}OSO_3.NH_2(CH_2CH_2OH)_2$$

The fatty acid ethanolamine lauryl sulphates, as well the other sulphonated fatty acid surfactants, can be applied in the form of a foam given their detergent properties. This is an advantage, as will be hereinafter described in further detail.

The respective amounts of the methacrylate, novolak resin and sulphonated surfactant used in the compositions of the invention are those which provide the desired degree of stain release from the fibrous materials, without adversely effecting the finish of the fibrous materials or reducing the effects of fluorochemical treatments for water repellency. It has surprisingly been found that sulphonated surfactants can replace to a significant extent the methacrylate polymer and novolak resin previously thought to be necessary in significant quantity.

This substitution enhances the effects of the treating composition in a number of unexpected ways. Firstly, the substitution provides a greater penetration into the fibrous materials, thereby ensuring that the totality of fibers are treated. Secondly, the gluing effect which results from the direct application of high concentrations of methacrylate polymer in the order of 15% to 90% in association with a novolak resin is avoided giving a soft handling finish to polyamide fibers. This is particularly significant in the carpet industry where a high texture bloom (opening of the yarn ends to give softer feel or hand) is demanded by carpet customers, particularly in respect of nylon carpets. As treated fibers according to this invention are not washed to remove non-fixed material, significant economic and environmental benefits apply. Thirdly, methacrylate polymers and novolak resins reduce the effects of fluorochemical treatment due to their strong hydrophilic properties and hence the ability to reduce the amounts of these materials without diminishing stain release properties is an important advantage.

Generally, the compositions of the invention contain from 10% to 90% by weight of sulphonated surfactant, preferably 30% to 80% by weight and more preferably 30% to 60% by weight. The methacrylate polymer and novolak resin are generally provided in approximately the same weight percentage in the composition, in amounts from about 5% by weight to 30% by weight, preferably 10% to 20% by weight.

The treating compositions according to the invention may contain other ingredients which increase effectiveness, stability of the composition, miscibility, foaming properties and the like. For example, these compositions may contain ingredients which make the composition more suitable for use and less susceptible to degradation.

Minor amounts of additives such as wetting agents improve migration of compositions along fiber tips and improve stability of the compositions. An example of such a wetting agent is wetting agent NF™ from Hoechst AG which is a modified diestersulphosuccinate acid surfactant.

Minor amounts of de-aerating and stabilizing additives may be used in an amount from 1% to 10% by weight. An example of such an ingredient is Leonil™ GP-Z from Hoechst AG, which composition is a nonylphenylethoxylate surfactant.

Divalent metal salts may be used in the treating compositions. Suitable divalent metal salts include water-soluble inorganic and organic salts of metals, such as magnesium, calcium and zinc. Organic metal salts include, for example, acetates and formates of the aforementioned metals. Preferred divalent metal salts are magnesium sulphate, magnesium chloride and calcium chloride. Mixtures of two or more divalent metal salts may be used. When divalent metal salts are added to the treating composition, they are preferably used in an amount of at least 0.5% by weight of solids, based on the weight of the fabric ("owf"), more preferably at least 1% by weight of solid owf, most preferably at least 2% by weight of solid owf.

Preferably, an organic acid, more preferably a volatile aliphatic carboxylic acid, is used in the treatment compositions according to the invention. Examples of volatile carboxylic acids include formic acid, acetic acid, propionic acid, butyric acid and valeric acid, with formic acid and acetic acid being particularly preferred. Acids are believed to assist in fixation of stain release reagents to polyamide fibers. Conventional methods in the art use strong mineral acids and non-volatile acids for fixation of novolak resins and methacrylate polymers. These acids must be removed by washing of the fibers. Volatile acids, in contrast, are simply removed from polyamide fibers during conventional drying procedures, which for carpets is above 120° C. Under such conditions, volatile acids are liberated from the fibers leaving no acidic residue. Acids may be used in an amount from 0.1% to 5% by weight of the composition at a pH of about 2.0 to 4.0. Without wishing to be limited to any reaction mechanisms, it is believed that at low pH the affinity of the stain release reagents and the polyamide fiber is greater, allowing chemical bonding by dipolar attraction as well as covalent bonding to amine groups on the fiber (the sites of dye binding).

Foaming agents as are well known in the art may be incorporated into the composition of the invention in order to assist application as a foam. Alternatively, the composition itself may form a foam on agitation due to the properties of the sulphonated surfactant or other components.

The aforementioned ingredients may be simply added to the composition of the invention prior to treating fibrous material.

The composition of the invention may be coapplied with a fluorochemical composition in order to provide oil, water and soil repellency (that is, stain resistance) in addition to stain release properties. The fluorochemical composition is added in an appropriate amount to the treating solution. The resultant compositions may be referred to as stain release/resistant compositions.

The fluorochemicals which may be used in the present invention for providing oil and water repellency include anionic, cationic, or nonionic fluorochemicals which are usually provided as aqueous emulsions, such as the fluorochemical allophanates disclosed in U.S. Pat. No. 4,606,737 (Stern); fluorochemical polyacrylates disclosed in U.S. Pat. Nos. 3,574,791 (Sherman et al.) and 4,147,851 (Raynolds); fluorochemicals urethanes disclosed in U.S. Pat. No. 3,398,182 (Guenthner et al.); fluorochemical carbodiimides disclosed in U.S. Pat. No. 4,024,178 (Landucci); fluorochemical guanidines disclosed in U.S. Pat. No. 4,540,497 (Chang et al.); and fluorochemical potassium salts (which are self curing or cross-link under ambient temperatures).

The fluorochemical, when included in the treating solution, is preferably present in an amount that is sufficient to retain on the fiber of the finished article about 200 to 1000 ppm fluorine based on the weight of the fiber. This can generally be achieved by using at least about 0.4% product owf, more preferably at least 0.7% product owf, most preferably 0.8% product owf. Generally, amounts of the fluorochemical in excess of 2% product do not appreciably improve the oil and water repellency.

The respective components of the treating composition are admixed utilizing standard procedures. Heat and agitation may be applied as necessary. The pH of the treating solutions depends on the fiber being treated. Generally, the pH is acidic in the range of 2.0 to 4.0, more preferably 2.5 to 4.5. pH may be adjusted with acid or base reagents.

The treatment composition according to the invention can be conveniently applied directly to a fibrous substrate by spraying, dipping, coating, padding, foaming or roller coating application, or by a combination of two or more of these methods. Application by way of foaming is particularly preferred as the amount of composition applied is much decreased compared to other applications, wastage of treating solution is minimized and processing is streamlined. In this regard, the use of alkanolamine and alkanolamide sulphonated fatty acids are particularly preferred given their detergent properties and the subsequent ease with which foaming preparations can be prepared according to processes well known in the art. As no washing is required to remove non-fixed reagents, overall processing is streamlined and waste products minimized.

The interaction between the components of the treatment composition of the invention may be regarded as synergistic. Alternatively, the result of the combination may be regarded as unexpected. These considerations arise from a number of perspectives. Sulphonated surfactants have not hitherto been proposed as stain release agents. When applied directly to fibrous materials such as carpets at high levels, excess sulphonated surfactants have the disadvantage that they leave a filmy residue after drying and actually attract dry soil, (such problems are associated with the processes of U.S. Pat. No. 4,699,812 (Munk et al.) described earlier in this document). However, when sulphonated surfactants are used in combination with a methacrylate polymer and novolak resin (that is, to substitute a proportion of these components), these problems are overcome, particularly in the situation where the sulphonated surfactant is used to an appreciable extent, such as 15% to 80% by weight of the treatment composition.

The use of a sulphonated surfactant in the treatment composition of the invention does not adversely effect the actions of the methacrylate polymer and novolak resin and removes disadvantages associated with these agents. For example, methacrylate polymers when applied directly (that is, without washing after application) to fibrous materials may cause aggregation or a gluing effect which adversely effects the finished product, giving a hard texture due to the aggregated fibers as well as a poor texture bloom. This is a particular problem in nylon carpets where the weight of the carpet determines costs. Where standard nylon carpets are treated with methacrylate polymers and novolak resin by direct application, the fiber aggregation is such that the carpet appears to have a much less open bloom and therefore gives the impression of being of a much lesser quality, that is, less weight per square yard. Utilizing the compositions of this invention, however, carpets are provided with a normal open bloom which gives the impression of a much greater weight carpet, particularly with carpet yarn density below 20 oz/yd$^2$ (ounces/square yard).

The interaction between the components of the treatment composition of this invention also removes the problems associated with coapplication of fluorochemicals for water and oil repellency. Methacrylate polymers and novolak resins have been found to be hydrophilic in nature and the use of these treating compositions as in prior known proposals largely reduces the effects of fluorochemical treatment, namely water repellency. In the treatment compositions of this invention these problems are overcome with the result that the methacrylate polymer and novolak resin employed in the composition do not effect the performance of coapplied fluorochemicals. This is particularly advantageous.

Fibrous material which may be treated according to this invention include polyamide fibrous materials such as nylon and wool carpets, nylon, wool, silk fabrics and natural and synthetic leathers.

The following non-limiting examples serve to illustrate the invention. All ratios are by weight and percentages are weight percent unless otherwise indicated.

TEST METHODS

A. Oil Repellency Test (OR)

The oil repellency of treated carpet and textile samples is measured by the American Association of Textile Chemists and Colorists (AATCC) Standard Test Method No. 118–1983, which test is based on the resistance of treated fabric to penetration by oils of varying surface tensions. Treated fabrics resistant only to Kaydol™, a brand of mineral oil and the least penetrating of the test oils, are given a rating of 1, whereas treated fabrics resistant to heptane (the most penetrating of the test oils) are given a value of 8. Other immediate values are determined by use of other pure oils or mixtures of oils, as shown in the following table:

| STANDARD TEST LIQUIDS | |
| --- | --- |
| AATCC Oil Repellency Rating Number | Composition |
| 1 | Kaydol ™ |
| 2 | 63:35 Kaydol ™: hexadecane by volume at 21° C. |
| 3 | n-hexadecane |
| 4 | n-tetradecane |
| 5 | n-dodecane |
| 6 | n-decane |
| 7 | n-octane |
| 8 | n-heptane |

The rated oil repellency corresponds to the most penetrating oil (or mixture of oils) which does not penetrate or wet the fabric after ten seconds contact. Higher numbers indicate better oil repellency.

In the test procedure the test sample is placed on a flat surface. A dropper pipette is used to gently place five drops of the selected oil onto the sample at 5 cm intervals. After ten seconds, if four out of five drops are still visible, the sample passes the test. A rating of "2" is generally considered a minimum requirement.

B. Water Repellency Test (WR)

The aqueous stain or water repellency of treated samples is measured using a water/isopropyl alcohol test, and the result is expressed in terms of a water repellency rating of the treated fabric. Treated fabrics which are resistant to a 100% water/0% isopropyl alcohol mixture (the least penetrating of the test mixtures) are given a rating of W; resistance to a 90% water/10% isopropyl alcohol mixture is given a rating of 1, whereas treated fabrics resistant to 0% water/100% isopropyl alcohol mixture (the most penetrating of the test mixtures) are given a rating of 10. Other intermediate values are determined by use of other water/isopropyl alcohol mixtures, in which the percentage amounts of water and isopropyl alcohol are each multiples of ten. Results are reported as an average of replicate testing. The water repellency rating corresponds to the most penetrating mixture which does not penetrate or wet the fabric after ten seconds.

The procedure involves placing five small drops of water/alcohol mixture onto the carpet face. After ten seconds, if four out of five drops are still visible, the sample passes the test.

A rating of "1" (90/10 water/isopropanol mixture) is generally considered as a minimum requirement.

C. Dry Soil Repellency (DS)

This test is intended to measure the tendency of a carpet to resist dry soil during the use. The soil contains clay, carbon black, silica and mineral oil. It is deposited on to the carpet via a soil capsule in a tumbler containing seventy steel balls. The tumbler rotates for ten minutes and the carpet samples are removed and the excess soil is blown off by an air nozzle at 50 psi. The degree of soiling resistance is measured by comparing the soiled area to a standard rating board. A 5.0 rating is the absolute standard of soil repellency and 3.0 is an acceptable soiling degree.

D. Twenty Four Hour Stain Release Test (SR)

This test is designed to evaluate the effectiveness of stain resistant treatments on carpet against acid staining medium (artificial colourings in food and drink). A stock solution using 80 mg of FD8C Red 40 is dissolved in one liter of water containing citric acid to pH 3.0±0.2; a 15 ml aliquot of the staining medium is deposited on carpet sample via a bottomless staining ring of approximately 50 mm internal diameter. The stained sample was left untouched for 24±four hours in room temperature, on a flat and non-absorbing surface. It is rinsed in luke-warm running water until no more stain is released, then dried and rated against 3M Stain Release Rating Scale—where a score of 8.0 is absolute stain release, 6.0 is average and scores under 5.0 are not acceptable.

E. MBTF Light Fastness (LF)

This test determines the colour fastness of textiles to light, using an artificial light source. A test specimen of the textile, together with blue light fastness standards, is exposed to the light from a 500 W mercury vapour, tungsten filament lamp. Fading/colour change is rated against the blue scale standards—while 8.0 as an absolute rating and 5.0 as a minimum industry requirement.

F. Handle of Texture (HAND)

Assessment is done by subjectively "feeling" the surface texture and comparing the sample to that from a conventional finish. The softness degree of the sample finished by foam co-application must be about the same as the conventional finish which is described as the one accomplished by the hot flood of the stain release and spraying of the Scotchgard™ product.

G. Opening of Texture (Bloom)

Assessment is done by visual or microscopic close-up observation of the texture for the opening of the individual yarn (made up of a group of filament). An "open" bloom is defined as similar to that of the texture of carpet receiving no protective chemical finish, that is, the filaments do not bundle closely together. This achievement is particularly significant for lower weight carpets (below about 20 oz=680 gsm). A carpet with an open bloom has the appearance of an expansion or spread of the carpet fibers, giving a greater apparent bulk. For a given weight carpet, it is advantageous to provide the appearance of increased bulk.

EXAMPLE 1

The stain release and other test properties outlined above were compared using sulphonated surfactants only, a combination of novolak resin and polymethacrylate polymer, and the combination of sulphonated surfactant, novolak resin and polymethacrylate polymer according to this invention.

In this example, 108 grams of each product were dissolved in one liter of water. The solution was applied to a 19 oz/yd$^2$ cut pile nylon 6.6 carpet in an amount of 15% by weight of the carpet resulting in a minimum application level of 1.6% product on carpet (POC). The solution also contained 4 g of magnesium sulphate dihydrate and 47 g of an anionic fluorochemical (0.7% POC) in order to test for water and oil resistance, and soil repellency. The treatment compositions were applied by direct spray, foam and pad methods. For the test results described in this example, spray application was used. After application, the carpet was subjected to drying in an oven at between 120° C. to 130° C. until dry. The parameters assessed were oil repellency (OR), water repellency (WR), dry soil repellency (DS), twenty four hour stain release (SR), MBTF of light fastness (LF), handle of texture (HAND) and opening of texture (Bloom). The treatment composition of the invention contained the following components:

| 1. methacrylate polymer | F-7867 | 15% |
| 2. novolak resin | FX-369 | 14% |
| 3. sulphonated surfactant | Empicol DA | 50% |
| 4. wetting agent | NF | 1% |
| 5. de-aerator | Leonil GP-Z | 7% |
| 6. formic acid | | 3% |
| 7. water | | 10% |

The treatment composition was applied at 1.6% product owf.

Components (1) and (2) are commercially available products of Minnesota Mining and Manufacturing Company, St. Paul, Minn., U.S.A. Component (1) is a polymethacrylic acid polymer formed from methacrylic acid and one or more monomers having ethylenic unsaturation. The molecular weight of the polymer is preferably in the range of 800 to 10,000 daltons. The partially sulphonated novolak resin (2) has a sulphonic equivalent weight of preferably 400 to 900.

Component (3) is from Albright & Wilson Australia Ltd., St. Marys, New South Wales, Australia, and comprises diethanolamine lauryl sulphate. Component (4) is a non-flammable (NF) wetting agent from Hoechst AG, Frankfurt, Germany which comprises a modified diester sulphosuccinic acid surfactant, which component improves stability of the composition at low temperature (below 5° C.). Component (5) is from Hoechst AG and comprises a nonyl phenol ethoxylate and alkane sulphonate surfactants in isopropanol, and is used as a de-aerator as well as to assist in solubilization and stabilization of F-7867 and FX-369.

The test results obtained from the above treatments are set forth in Table 1 below:

| | OR | WR | DS | SR | LF | HAND | BLOOM |
|---|---|---|---|---|---|---|---|
| Surfactant/FC | 4 | 3 | 2 | 6 | 6 | Soft Filmy | Open |
| Novolak/FC | 4 | 1 | 3 | 7 | 2 | Moderate | Partial gluing |
| Methacrylate/FC | 4 | 0–1 | 4 | 7 | 6 | Harsh | Gluing |
| Novolak/methacrylate/FC | 4 | 0–1 | 4 | 8 | 6 | Harsh | Gluing |
| Combination | 4 | 3 | 3.5 | 8 | 6 | Soft | Open |

These results clearly show the unsatisfactory results obtained with the application of surfactant, novolak resin, methacrylate polymer, and the combination of methacrylate polymer and novolak resin when using the direct application method.

The application of surfactant alone at an elevated level gave a poor dry soil repellency, that is, it has a soil attraction defect due to residual surfactant left on the carpet. The use of surfactant alone in the treatment of fibrous materials is unsatisfactory.

Treatment of the carpet sample with the methacrylate polymer gave similar results to that of the novolak resin. A significant gluing of the fibers occurred with a resultant hard texture. The water resistance of the fluorochemical treatment was adversely affected.

In distinct contrast to the comparative treatments, the combination according to the invention of methacrylate polymer, novolak resin and sulphonated surfactant gave a treated product with excellent properties. Particularly notable is the open bloom of the treated material, soft texture, excellent stain release properties and no effect on the oil and water repellency of the fluorochemical treatment. The treatment composition showed excellent penetration into the carpet pile.

When surfactant was present in an amount from 5% to 90%, excellent stain release properties were observed. When the combined amount of novolak resin and polymethacrylate exceeds about 40% by weight, the test product shows poor water repellency and handle texture. Such an effect was not observed, however, in the presence of a sulphonated surfactant where the novolak resin and methacrylate polymer were used in amounts up to about 40% by weight.

In a specific group of tests the amounts of surfactant, novolak resin and polymethacrylic acid evaluated in the composition were as follows:

| Surfactant | 0% to 100% |
| Novolak resin | 0% to 17% |
| Polymethacrylic acid: | 0% to 88% |

EXAMPLE 2

A series of sulphonated surfactants were tested in place of diethanolamine lauryl sulphate utilizing the test methods and procedures of Example 1. Examples of surfactants investigated and the results obtained are set forth below:

(1) UNIVADINE PS-AU

Supplier: Ciba-Geigy Australia Pty. Ltd., Thomastown, Victoria, Australia

Composition: alkyl aryl sulphonated and hydroxyethylated fatty amine

Use of this product gave acceptable performance in the treatment composition of the invention (2) LANKROPOL WN Supplier: Lankro Chemicals Ltd., Manchester, United Kingdom Composition: alkylated diphenyl oxide disulphonates, sulphated monoester of fatty acid, containing sodium salt.

Use of this product gave an acceptable result in the treatment composition of the invention.

(3) TEBAN ES

Supplier: Dr TH Böhme Chemie GmbH & Co. Geretsried, Germany

Composition: Aryl sulphonates, fatty amine polyglycol ether (sulphonate ethylene oxide condensate).

This composition gave treatment compositions at the lower end of effectiveness. The product showed some propensity to attract soil and gave a barely acceptable texture bloom after treatment.

(4) MILTOPAN D 503 PASTE/LIQUID

Supplier: Henkel Australia Pty. Ltd., Broadmeadows, Victoria, Australia

Composition: Neutralized alkyl lauryl sulphonate. CAS No. 7732-18-5

This compound produced a very satisfactory treatment compound when combined with the novolak resin and methacrylate polymer. Minor problems were noticed with texture bloom.

(5) KEMMAT SN 18

Supplier: Swift Watts Winter Pty. Ltd., Silverwater, New South Wales, Australia

Composition: Dimethyl benzene sulphonic acid, sodium salt, containing xylene (generally called sodium xylene sulphonate)

Resulting treatment composition was at the lower end of effectiveness, particularly in relation to stain release property.

EXAMPLE 3

Treatment by Direct Foam Application Followed by a Drying/Curing Step

Nylon 6,6 carpet was treated on a commercial scale using the combination of the invention particularized in Example 1, namely containing 50% sulphonated surfactant, 14% methacrylate polymer and 15% sulphonated novolak resin.

The product was applied by foam via a Texicon Autofoamer with a 1 mm applicator slot. The composition of the invention was dosed at 1.6% product on carpet in conjunction with an anionic aliphatic fluorochemical at 0.7%. The following parameters were recorded:

| | |
|---|---|
| Stain release composition: | 108 g/L |
| Fluorochemical: | 47 g/L |
| Magnesium sulphate dihydrate: | 4 g/L |
| Wet pick-up: | 15% add-on based on dry carpet weight |
| Blow ratio: | 60:1 |
| Gap setting: | 1 |
| Liquor back pressure: | 45 psi |
| Foam back pressure: | 50 psi |
| Foam quality: | continuous fine lather |

The application was on wet carpet after dyeing and steam washing. The carpet was dried at 130° C. and was later latex backed. Performance achieved was as follows:

| | OR | WR | DS | SR | LF | HAND | BLOOM |
|---|---|---|---|---|---|---|---|
| Sample | 4 | 3 | 3.5 | 8 | 6 | Soft | Open |
| Desirable performance | 2 | 1 | 3.0 | 7 | 5 | Soft | Open |

Large scale carpet treatment using coapplication of the treatment composition and the fluorochemical in the form of a foam followed directly by drying the carpet gave a product of excellent finish and performance. The Handle and the texture is superior to conventional treatments applied directly (that is, without a post-treatment washing step).

EXAMPLE 4

Treatment by Direct Spray Application Followed by Air Drying/Curing

This example indicates that the composition of the invention can be applied in conjunction with a fluorochemical directly to installed carpets to give similar properties of stain release and stain resistance to carpets treated commercially during the manufacturing stage.

In this example, the compound and fluorochemical were applied via an airless sprayer at 25 psi pressure, 7 m/minute speed, at 15% wet add-on to a wet/precleaned nylon 6,6 carpet of 680 g (19 oz/yd$^2$).

The solution contained the following ingredients per liter:

108 g (1.6% product on carpet) of the treatment composition of Example 1.

100 g (1.5% product on carpet) of a fluorochemical potassium salt, which comprises a C6/C8 hybrid potassium salt of a fluoroaliphatic acid in butyl cellosolve and isopropanol.

792 g water.

The carpet was allowed to air dry at ambient temperature at 23±2° C. overnight. Standard tests of stain release and stain resistance were carried out with the following performance:

| | OR | WR | DS | SR | HAND | BLOOM |
|---|---|---|---|---|---|---|
| Sample | 2 | 1 to 2 | 4.0 | 7.5 to 8.0 | Soft | Open |
| Desirable performance | 2 | 1 | 3.0 | 7 | Soft | Open |

The composition of the invention is therefore also suitable for application to installed carpet and other polyamide fabrics. Heat treatment is unnecessary when fluorochemicals which self-cure or cross-link under ambient conditions are used.

I claim:

1. An aqueous treating composition for providing stain release properties to fibrous materials which comprises:
   (a) an acrylic polymer selected from the group consisting of: polymethacrylic acid, copolymers of methacrylic acid, and combinations thereof,
   (b) a partially sulphonated novolak resin,
   (c) a surfactant comprising a mono-, di- or tri-ethanolamine lauryl sulphate, and
   (d) water.

2. The composition of claim 1 which comprises:
   (a) 5% to 30% by weight of a methacrylate polymer, (b) 5% to 30% by weight of a partially sulphonated novolak resin, and (c) 10% to 90% by weight of a surfactant comprising a mono-, di- or tri-ethanolamine lauryl sulphate.

3. The composition of claim 1 which additionally includes a fluorochemical for providing oil and water repellency.

4. The composition of claim 1 which additionally includes a volatile organic acid, which can be removed after application of the composition to a substrate by drying at temperatures above 120°.

5. A process for providing a substrate material selected from fibrous material and leather with stain release which comprises applying to said material a composition according to claim 1 and thereafter drying the material.

6. A process according to claim 5 wherein the fibrous material is a carpet, textile fabric or synthetic leather.

7. A process according to claim 5 wherein a fluorochemical is coapplied or applied separately to the composition according to claim 1 in order to provide oil and water repellency.

8. A process according to claim 7 wherein drying of the treated material takes place under ambient conditions in the presence of a fluorochemical which self cures or cross-links under ambient conditions.

* * * * *